(12) United States Patent
Fuchs et al.

(10) Patent No.: US 7,903,593 B2
(45) Date of Patent: Mar. 8, 2011

(54) MULTICAST TRANSMISSION IN PACKET BASED CELLULAR NETWORKS

(75) Inventors: Meir Fuchs, Modyin (IL); Ram Arye, Rishon Lezion (IL); Alexander Rosenbaum, Raanana (IL)

(73) Assignee: Runcom Technologies Ltd., Rishon Lezion (IL)

( * ) Notice: Subject to any disclaimer, the term of this patent is extended or adjusted under 35 U.S.C. 154(b) by 2087 days.

(21) Appl. No.: 10/487,516

(22) PCT Filed: Aug. 22, 2002

(86) PCT No.: PCT/IL02/00701
§ 371 (c)(1),
(2), (4) Date: Feb. 19, 2004

(87) PCT Pub. No.: WO03/019840
PCT Pub. Date: Mar. 6, 2003

(65) Prior Publication Data
US 2004/0266440 A1    Dec. 30, 2004

Related U.S. Application Data

(60) Provisional application No. 60/332,000, filed on Nov. 23, 2001.

(30) Foreign Application Priority Data

Aug. 23, 2001 (WO) .................. PCT/IL01/00785

(51) Int. Cl.
*G06F 15/16* (2006.01)
(52) U.S. Cl. ........................... 370/310; 455/428

(58) Field of Classification Search .................. 370/230, 370/232, 236, 310, 312, 335, 432; 455/416, 455/445, 518
See application file for complete search history.

(56) References Cited

U.S. PATENT DOCUMENTS

| | | | |
|---|---|---|---|
| 5,541,927 A | 7/1996 | Kristol et al. | |
| 5,727,002 A | 3/1998 | Miller et al. | |
| 5,862,329 A | 1/1999 | Aras et al. | |
| 5,887,252 A | 3/1999 | Noneman | |
| 5,905,871 A | 5/1999 | Buskens et al. | |
| 5,978,368 A | 11/1999 | Hjelm et al. | |
| 6,014,089 A | 1/2000 | Tracy et al. | |
| 6,104,709 A | 8/2000 | Rinchiuso et al. | |
| 6,104,929 A | 8/2000 | Josse et al. | |
| 6,108,706 A | 8/2000 | Birdwell et al. | |
| 6,115,754 A | 9/2000 | Landgren | |
| 6,122,483 A | 9/2000 | Lo et al. | |
| 6,141,347 A | 10/2000 | Shaughnessy et al. | |
| 6,144,651 A | 11/2000 | Rinchiuso et al. | |
| 6,188,911 B1 | 2/2001 | Wallentin et al. | |

(Continued)

OTHER PUBLICATIONS

Cisco; "GPRS White Paper;" Retrieved from Internet: <http://www.cisco.com/warp/public/cc/so/neso/gprs/gprs_wp.htm> [Retrieved on Aug. 22, 2001;] pp. 1-19.

(Continued)

*Primary Examiner* — Sam Bhattacharya
(74) *Attorney, Agent, or Firm* — Robert G. Lev (57) ABSTRACT

A method of transmitting data packets to a cellular mobile unit, comprising: establishing a data transfer path for providing data from a data network gateway to a base station controller, for a first mobile station identity; and transmitting data received along the established path to at least one mobile station having at least one second identity different from the first identity.

24 Claims, 5 Drawing Sheets

U.S. PATENT DOCUMENTS

| | | |
|---|---|---|
| 6,260,168 B1 | 7/2001 | Godoroja |
| 6,269,080 B1 | 7/2001 | Kumar |
| 6,320,873 B1 | 11/2001 | Nevo et al. |
| 6,331,983 B1 | 12/2001 | Haggerty et al. |
| 6,339,594 B1 | 1/2002 | Civanlar et al. |
| 6,360,076 B1 | 3/2002 | Segura et al. |
| 6,370,153 B1 | 4/2002 | Eng |
| 6,453,438 B1 | 9/2002 | Miller et al. |
| 6,477,149 B1 | 11/2002 | Okanoue |
| 6,804,528 B1 * | 10/2004 | Laroia et al. ............ 455/503 |
| 2002/0038441 A1 | 3/2002 | Eguchi et al. |
| 2002/0102967 A1 | 8/2002 | Chang et al. |
| 2002/0106985 A1 | 8/2002 | Sato et al. |
| 2002/0115454 A1 | 8/2002 | Hardacker |
| 2003/0007499 A1 | 1/2003 | Rajahalme |
| 2003/0021286 A1 | 1/2003 | Boscovic et al. |
| 2003/0039225 A1 | 2/2003 | Casati et al. |
| 2003/0046539 A1 | 3/2003 | Negawa |
| 2003/0073453 A1 | 4/2003 | Basilier |
| 2003/0100325 A1 | 5/2003 | Paila et al. |
| 2004/0233907 A1 | 11/2004 | Hundscheidt et al. |
| 2007/0173269 A1 * | 7/2007 | Laroia et al. ............ 455/500 |

OTHER PUBLICATIONS

GSM (Global System for Mobile Communications) technical specification; "3$^{rd}$ Generation Partnership Project; Technical Specification Group Services and System Aspects; General Packet Radio Service (GPRS;) Service description; Stage 2; (Release 1997);" GSM group; identified as 3GPP TS 03.60 V6.9.0 (Jun. 2001); Available from Internet: <ftp://ftp.3gpp.org/Specs/2001-06/R1997/03_series/0360-690.zip>; pp. 1-108.

* cited by examiner

MULTICAST TRANSMISSION IN PACKET BASED CELLULAR NETWORKS

RELATED APPLICATIONS

The present application is a U.S. national application of PCT Application No. PCT/IL02/00701, filed on Aug. 22, 2002, which claims priority from PCT Application No. PCT/IL01/00795, filed on Aug. 23, 2001 and claims the benefit under 35 U.S.C. §119(e) of U.S. Provisional Application No. 60/332,000, filed on Nov. 23, 2001, the disclosures of which documents are incorporated herein by reference.

FIELD OF THE INVENTION

The present invention relates generally to content delivery and multimedia broadcasting over cellular networks particularly to multicast services over packet based cellular networks.

BACKGROUND OF THE INVENTION

Packet based networks were originally constructed in order to transmit data between computers. Packet based networks comprise a plurality of routers interconnected through communication links. Data transmitted in packet based networks are encapsulated in packets which each contain an address of a destination of the packet. Bach router forwards packets it receives toward the destination of the packets.

Due to the low cost of packet based networks relative to switched networks (e.g., the standard telephone network) packet based networks are now used for many additional services, such as multimedia streaming, data broadcasting and telephone and fax transmission. Most homes, however, are not connected directly to a packet based network but rather are connected to switched networks. In order to access packet based networks, users establish a modem connection over the switched telephone network to a gateway, e.g., an Internet service provider (ISP), which connects the users to the packet based network.

Cellular telephone networks provide telephone communications to telephone sets, referred to as mobile stations, which are not confined to a specific location. As with wired telephone networks, it is desired to use the mobile network to access packet based networks from the mobile stations. In order to provide data services over mobile networks efficiently, the General Packet Radio Service (GPRS) protocol was defined. The GPRS protocol is described, for example, in HTTP://www.cisco.com/warp/public/cc/so/neso/gprs/gprs_wp.htm, available on Aug. 22, 2001, and in the GSM technical specification, titled "3rd Generation Partnership Project; Technical Specification Group Services and System Aspects; GPRS; Service description; Stage 2 (Release 1997)", of the GSM group, identified as 3GPP TS 03.60 V6.9.0 (2001-06) available for example from ftp://ftp.3gpp.org/Specs, the disclosures of which are incorporated herein by reference. According to the GPRS protocol, a mobile station (MS), which requires a data session, registers with a serving GPRS support node (SGSN). Thereafter, the MS generates a context request which initiates a context assignment procedure in which the MS is associated with a packet based address of an external packet based network.

In some cases, packet based networks are used to provide multicast services, in which a single source transmits the same data to a plurality of recipients. In order to reduce the bandwidth consumption of multicast services, multicast routing protocols, such as IGMP (Internet gateway multicast protocol), MOSPF, PIM-SM/DM and SSM, have been defined. According to these protocols, each router receives only a single copy of multicast data, and forwards one copy of the data in each direction in which there is at least one recipient desiring to receive the data.

The elements of cellular networks do not generally support multicasting. Therefore, when a gateway between a packet based network and a switched network (e.g., a GGSN) receives multicast packets it duplicates them for each mobile station requiring to receive the packets. This is very wasteful in bandwidth.

Proprietary multicast schemes for cellular networks do exist. The Cell Broadcast Service (CBS), for example, provides low bit rate multicasting to a group of mobile stations. U.S. Pat. No. 5,887,252 to Noneman, the disclosure of which is incorporated herein by reference, describes using multicast transmission over CDMA cellular networks. Noneman describes multicasting from a base station to a group of mobile stations. The Noneman patent, however, does not state a method for leading multicast packets within the terrestrial mobile network.

U.S. Pat. No. 5,978,368, which is incorporated herein by reference, suggests pre-generating unassigned channels in a terrestrial cellular network. When a mobile station requests to establish a channel, a pre-generated channel is assigned to the mobile station. This method reduces the delay between requesting the channel and receiving the channel.

SUMMARY OF THE INVENTION

An aspect of some embodiments of the invention relates to a method of routing through a cellular network only a single copy of multicast data, optionally from an external data network, to a plurality of mobile stations (MSs) in a cell. The method includes emulating a virtual subscriber mobile station (MS) that subscribes to a multicast service and receives the multicast data for the cell. The real MSs that should receive the multicast data tune to a channel assigned to the virtual subscriber. Optionally, emulating the virtual subscriber is performed by transmitting messages normally transmitted by an MS, by an element of the cellular network servicing the MSs. Optionally, at least some of the elements of the cellular network (e.g., an SGSN servicing the MSs) and/or of an external packet network generating the multicast data do not differentiate between the virtual subscriber and real subscribers.

The term multicast service refers herein to multicast data which is received by one or more users subscribing to the service. Generally, the data of a specific multicast service relates to a single subject or context.

In some embodiments of the invention, the virtual subscriber is emulated by a packet control unit (ECU) of the cellular network. Alternatively or additionally, the virtual subscriber is emulated by a multicast supporting unit added to the cellular network for multicast support. In this alternative, the PCU does not differentiate between real and emulated subscribers. The multicast supporting unit may be added, for example, between the PCU and the base station controller (BSC) with which it operates and/or between the BSC and the MSs.

An aspect of some embodiments of the invention relates to a method of establishing cellular data connections with an external packet based network. At least some of the context requests transmitted toward a gateway connecting a cellular network to the packet based network, are not registered by the gateway for data transmission. Instead, the context requests are acknowledged, without registering a connection between a packet based address and the mobile station in the gateway. Optionally, the acknowledgment is generated by the gateway. Alternatively, the acknowledgment is generated by an intercepting unit which prevents the gateway from receiving some of the context requests.

In some embodiments of the invention, the mobile station (MS) requesting the context which is not registered to receive data transmission is provided with data from a different context, e.g., a context established by a virtual subscriber.

An aspect of some embodiments of the invention relates to a method of providing data packets to a cellular subscriber. Optionally, the cellular network instructs one or more MSs requesting a data context to move to a different cell, e.g., to an umbrella cell. In some embodiments of the invention, the MSs requested to move to umbrella cells comprise MSs requiring multicast data. In some embodiments of the invention, a virtual subscriber in the umbrella cell receives the data requested by the cell subscriber.

An aspect of some embodiments of the invention relates to defining multicast cells of a cellular network, which are to be used only for multicast data. In some embodiments of the invention, each multicast cell is used for only a single multicast service. Alternatively or additionally, one or more multicast cells are used for a plurality of multicast services.

In some embodiments of the invention, the multicast cells identify themselves as belonging to a different cellular network than regular cells being serviced by the same public land mobile network (PLMN), e.g., by the same BSC, PCU and/or SGSN. Thus, in some embodiments of the invention, a single PLMN supports transmission of signals which identify as belonging to a plurality of different networks. Optionally, in order to receive multicast service, MSs switch to the network identity of the multicast cells and request the multicast service.

In some embodiments of the invention, the multicast cell provides predetermined data and the data provided in the cell does not change responsive to requests of MSs. Alternatively, the data provided by the cell changes responsive to the requests of the MSs. For example, data of some multicast services may be provided only when at least one MS requests to tune onto the channel of the multicast service. Alternatively or additionally, the cell provides multicast services requested by the most MSs.

There is therefore provided in accordance with an embodiment of the present invention, a method of transmitting data packets to a cellular mobile unit, including establishing a data transfer path for providing data from a data network gateway to a base station controller, for a first mobile station identity, and transmitting data received along the established path to at least one mobile station having at least one second identity different from the first identity.

Optionally, the first mobile unit identity represents a virtual mobile unit. Optionally, the at least one mobile station having a second identity includes a plurality of mobile stations. Optionally, establishing the data transfer path for providing data includes establishing a data transfer path for providing IP multicast data. Optionally, establishing the data transfer path for providing data includes establishing the data transfer path responsive to a request to establish a data transfer path from the at least one mobile station having the at least one second identity. Possibly, the method includes establishing a data transfer path, substantially not used for data, for the at least one mobile station having the at least one second identity.

Optionally, the request to establish the data transfer path includes a context request. Optionally, the request to establish the data transfer path includes a request transmitted as data on a context of the at least one mobile station having the at least one second identity.

There is further provided in accordance with an embodiment of the present invention, a method of establishing a terrestrial mobile connection, including receiving a message indicating the intent to establish a first mobile data connection between a mobile station, having a first mobile station identity, and an external data network, and generating a request to establish a second mobile data connection with an external data network, for a second mobile station identity, responsive to receiving the message indicating the intent to establish the first mobile data connection.

Optionally, generating the request to establish the second mobile data connection includes generating a request carrying a same requester IP address as a requester IP address of the first mobile data connection. Optionally, generating the request to establish the second mobile data connection includes generating a request having a virtual mobile station identity. Optionally, generating the request to establish the second data connection includes determining whether the second connection already exists and generating the request only if the second connection does not exist. Possibly, the method includes instructing the mobile station for which the first mobile data connection was established to listen to a channel associated with the second data connection. Optionally, the request to establish the second data connection includes a multicast requester IP address.

Optionally, generating the request to establish the second connection includes determining whether the message indicating the intent to establish a first mobile data connection relates to a specific group of data connections and generating the request only if the first mobile data connection relates to the specific group. Optionally, the specific group of data connections are identified by their requester IP address. Optionally, the message indicating the intent to establish the first mobile connection includes a context request message. Optionally, the message indicating the intent to establish the first mobile connection includes a context acknowledge message. Optionally, generating the request to establish the second mobile connection is performed by a packet control unit (PCU). Optionally, generating the request to establish the second mobile connection is performed by an entity separate from a packet control unit (PCI), which does not have control of the PCU.

Optionally, generating the request to establish the second mobile connection is performed by an entity connected between the PCU and a respective BSC. Alternatively, generating the request to establish the second mobile connection is performed by an entity located between a BSC related to the PCU and mobile units serviced by the BSC.

There is further provided in accordance with an embodiment of the present invention, a method of operating a terrestrial cellular network gateway, including receiving requests to establish data connections, determining, for at least one of the requests, whether to form a connection with an external data network responsive to a content of the request, forming a connection with an external data network responsive to the at least one of the requests, if the at least one of the requests, and responding positively to the at least one of the requests, without forming a connection with an external data network, if the determination was negative. Possibly, determining whether to form a connection with an external data network includes determining for a specific request responsive to the requester identity listed in the request. Optionally, forming a connection is performed for requests carrying identities of virtual mobile connections.

There is further provided in accordance with an embodiment of the present invention, a method of managing a mobile unit, including receiving a request to establish a data connection from a mobile unit located in a first cell; and instructing the mobile unit to move to a second cell different from the first cell, responsive to the request to establish the connection.

Optionally, the second cell includes an umbrella cell for example, an umbrella cell overlaying the first cell. Possibly, the method includes instructing the mobile station to listen to a channel established for a different mobile station identity. Optionally, receiving the request includes receiving a request related to a multicast service. Optionally, the second cell comprises a cell used substantially only for multicasting data.

There is further provided in accordance with an embodiment of the invention, a multicast supporting packet control unit, including an input interface adapted to receive messages exchanged between mobile stations and a serving GPRS support node, a filter adapted to identify in the messages received by the input interface, messages which indicate the intent to establish a first data connection between a mobile station, having a first mobile station identity, and an external data network, and a data generator which generates a request to establish a second mobile data connection to an external data network, for a second mobile station identity, responsive to the identified message indicating the intent to establish the first mobile data connection. Optionally, the filter identifies messages related to multicast services. Optionally, the input interface serves also as an input interface of a packet control unit (PCU). Alternatively, the input interface does not serve as an input interface of a packet control unit (PCU). Optionally, the filter identifies channel assignment messages related to the first mobile data connection and changes for at least one of the identified channel assignment messages, the channel assigned by the message.

There is further provided in accordance with an embodiment of the invention, a method of communicating by a mobile station, comprising tuning onto signals of a first cell, receiving an instruction to receive data of a multicast service, identifying that multicast service is not provided in the first cell, and tuning onto signals of a second cell, responsive to the identifying.

Optionally, the signals of the first and second cells are transmitted under control of a same public land mobile network and/or a same base controller station (BSC). Optionally, receiving the instruction to receive data of a multicast service comprises receiving a user command or an automatically generated command. Optionally, the method includes transmitting a request to receive multicast data in the second cell. Optionally, the signals of the first and second cells comprise GSM signals.

Optionally, the signals of the first and second cells carry different network identities. Optionally, identifying that multicast service is not provided in the first cell comprises identifying based on information configured in the mobile station. Optionally, identifying that multicast service is not provided in the first cell comprises receiving a signal stating that the multicast service is not provided in the first cell. Optionally, receiving the signal stating that the multicast service is not provided in the first cell comprises receiving a service refusal signal and/or a cell change message.

There is further provided in accordance with an embodiment of the invention, a method of communicating by a mobile station, comprising tuning onto signals of a first cell, receiving an instruction to request a service not provided in the first cell, identifying that the requested service is not provided in the first cell, and tuning onto signals of a second cell, responsive to the identifying, wherein the signals of the first and second cells are transmitted under control of the same public land mobile network.

Optionally, the signals of the first and second cells are transmitted under control of the same base transmission station. Alternatively, the signals of the first and second cells are transmitted from different base transmission stations. Optionally, the signals of the first and second cells are transmitted under control of the same base controller station (BSC). Optionally, receiving an instruction to request a service not provided in the first cell comprises receiving a request for multicast data Optionally, receiving an instruction to request a service not provided in the first cell comprises receiving a request for a data service to be provided at least at a predetermined quality of service (QoS). Optionally, receiving an instruction to request a service not provided in the first cell comprises receiving a request for a Web access service. Optionally, the signals of the first and second cells carry different network identities.

There is further provided in accordance with an embodiment of the invention, a method of managing communications in a cellular network, comprising transmitting signals advertising first and second cells, under control of the same public land mobile network, receiving a request for providing a first communication service in the first cell, identifying that the requested first communication service is not provided in the first cell, transmitting a refusal to the request for the first service in the first cell, responsive to the identification, receiving a request for providing the first communication service in the second cell, and providing the first communication service in the second cell, wherein the requests for providing the first service are received from a mobile station in substantially the same location.

Optionally, the method includes receiving a request for providing a second communication service in the first cell and providing the second service in the first cell responsive to the request. Optionally, the second service comprises a multicast service and/or a web access service. Optionally, the method includes receiving a request for providing the second communication service in the second cell and refusing the second service in the second cell responsive to the request. Optionally, the method includes receiving a request for providing the second communication service in the second cell and providing the second service in the second cell responsive to the request.

Optionally, the first service comprises a two way communication service, for example a voice connection and/or a unicast data connection. Optionally, transmitting the refusal is performed irrespective of the load on the first cell. Optionally, transmitting signals advertising the first and second cells comprises transmitting the signals in regions which cover substantially the same geographical area. Optionally, transmitting the signals advertising the second cell comprises transmitting the signals by a first base station controller and changing the signals by an entity located between the first base station controller and mobile stations receiving the signals. Possibly, transmitting the signals advertising the first and second cells comprises transmitting the signals with different network identities.

Optionally, transmitting the refusal comprises transmitting a cell change message and/or a context refusal message. Optionally, the signals of the first and second cells carry different network identities.

There is further provided in accordance with an embodiment of the invention, a method of managing communications in a cellular network, comprising transmitting signals advertising first and second cells, under control of the same public land mobile network, receiving a request for providing a multicast service in the first cell, transmitting a refusal to the request for the multicast service in the first cell, receiving a request for providing the multicast service in the second cell, and providing the multicast service in the second cell.

Optionally, the requests for providing the first service are received from a mobile station in substantially the same location.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
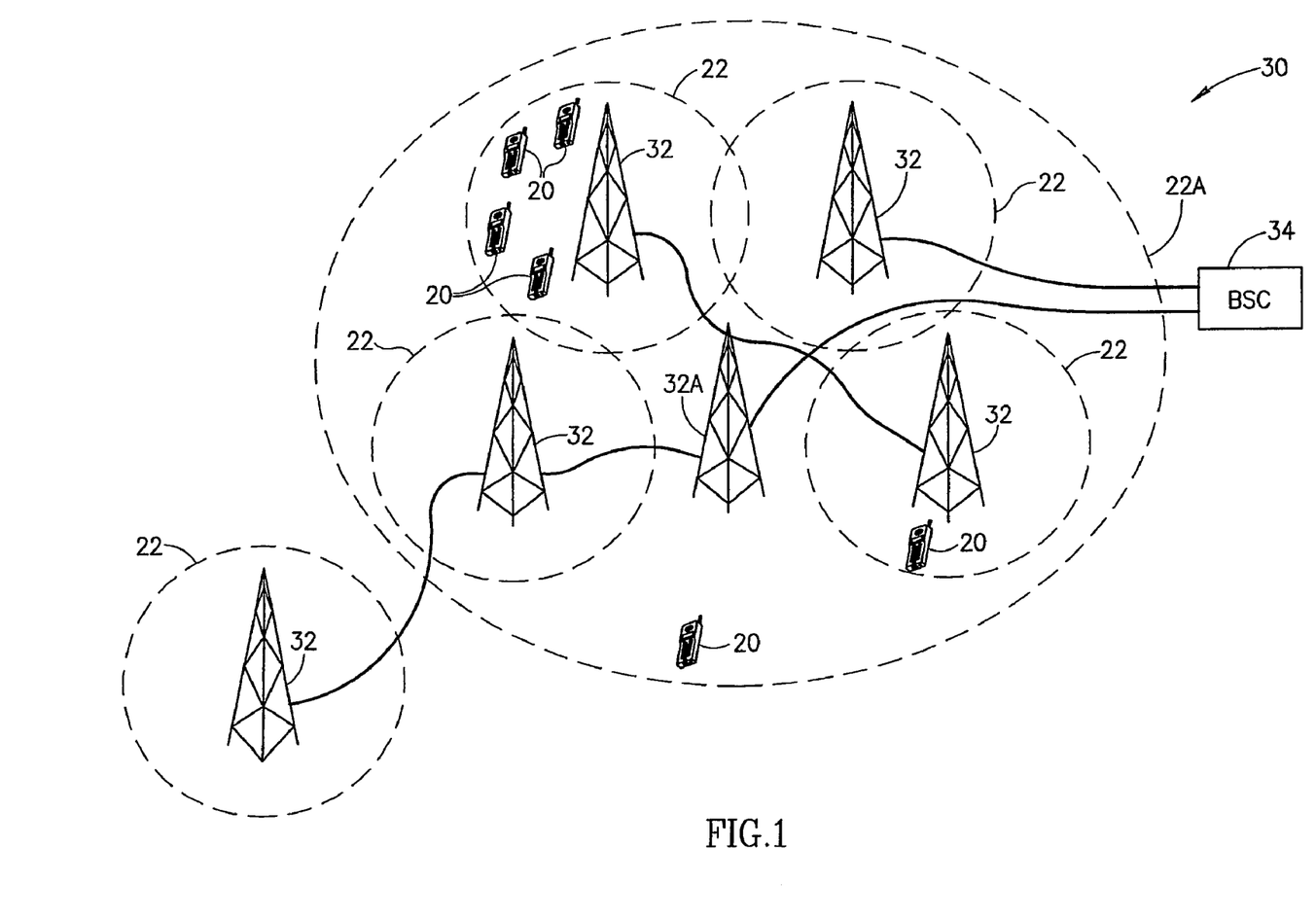
FIG. 1 is a schematic illustration of a base station subsystem, useful in explaining an exemplary embodiment of the present invention.

FIG. 1 is a schematic illustration of a base station subsystem 30, useful in explaining an exemplary embodiment of the present invention. Base station subsystem 30 comprises a plurality of base transceiver stations (BTS) 32, which communicate with mobile stations (MS) 20 located within respective areas serviced by the BTSs, referred to as cells 22. In some cases, one or more cells 22 are partially overlapping in order to ensure high quality cell coverage of an area. Optionally, one or more umbrella cells (marked 22A), serviced by respective base stations 32A, cover an area including a plurality of cells 22. Overlay cell 22A is generally utilized by cellular network 10 to cover areas not covered by smaller cells 22 and/or to reduce handover signaling messages required by fast moving MSs 20 because of frequent switching between servicing BTSs 32.

Generally, several BTSs 32 are connected together and controlled by a base station controller (BSC) 34. Generally, BTSs 32 perform the actual transmission of signals to the mobile stations 20, while BSCs 34 instruct the BTSs 32 which data to transmit on each channel.

Figure 2:
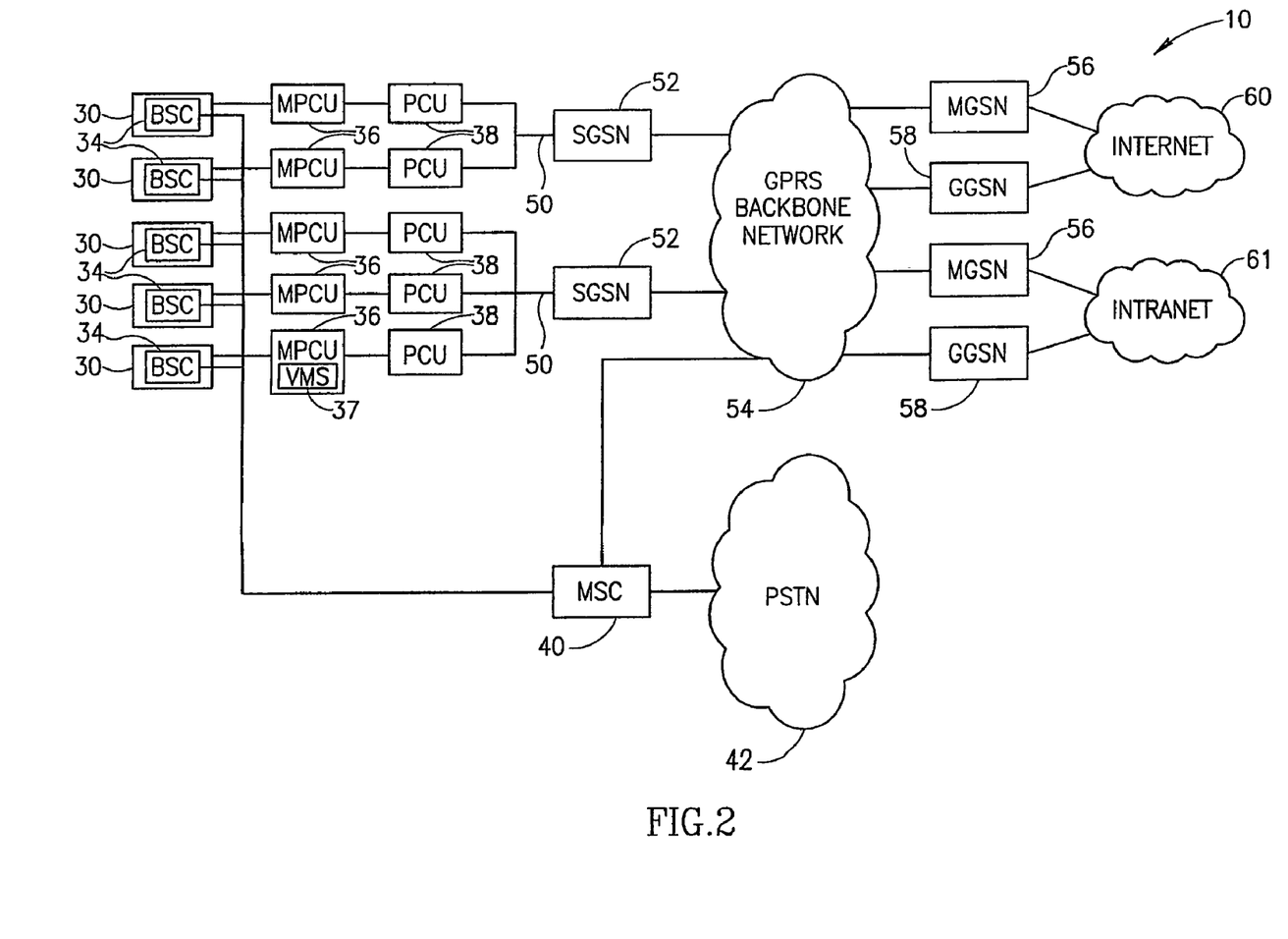
FIG. 2 is a schematic illustration of a cellular network, in accordance with an embodiment of the present invention.

FIG. 2 is a schematic illustration of a cellular network 10, in accordance with an embodiment of the present invention. Cellular network 10 comprises a plurality of BSSs 30 which provide cellular communication coverage over different regions. The BSCs 34 of BSSs 30 are connected to a mobile switching center (MSC) 40 which serves as a gateway to a public switched telephone network (PSTN) 42 and/or to any other voice network, e.g., other cellular networks. Each MS 20 (FIG. 1) has a unique IMSI (International Mobile Subscriber Identity) which is used to identify the MS in network 10.

Generally, cellular network 10 provides data services, for example, in accordance with the GPRS standard. At least one gateway GPRS support node (GGSN) 58 serves as an interface between cellular network 10 and one or more external IP networks, such as the Internet 60, an intranet 61 or any other data network. GGSN 58 exchanges packets, through a GPRS backbone network 54, with one or more serving GPRS support nodes (SGSNs) 52 which direct packets received from external networks (by GGSN 58) to their destination MS 20. SGSN 52 keeps track of the location of the MS's 20 in order to know through which BTS 32 the data is to be transferred to the destination MS 20. A single SGSN 52 may communicate with a plurality of GGSNs 58, e.g., for a plurality of external packet based networks.

In order to provide data services, each BSC 34 may be associated with a packet control unit (PCU) 38, which serves as an interface between the BSC 34 and a packet based network 50, internal to the cellular ground network, leading to a respective SGSN 52. PCU 38 converts packets directed to MSs 20 into data streams suitable for transmission by BTSs 32 and converts data streams transmitted by MSs 20 into packets for transmission to GGSN 58.

As is known in the art, when an MS 20 wants to use data communication services, the MS 20 registers at an SGSN 52 servicing the cell 22 in which the MS 20 is currently located. The SGSN 52 checks whether the user is allowed to receive data services, and if so the SGSN 52 assigns the MS 20 a packet temporary mobile subscriber identity (P-TMSI) with which the MS 20 is identified, for security purposes, in network 10.

Thereafter, the MS 20 requests from SGSN 52 a packet data protocol (PDP) context which defines the packet based network to be used, the GGSN to be used to access the packet network (e.g., in an access point name (APN) field), a QoS to set the priority of the transfer of signals to the MS 20 within network 10, and optionally an address to identity the MS 20 in the packet network. The context request of the MS 20 is followed by a context generation procedure in which the MS 20, the SGSN 52 and the GGSN 58 exchange information and determine the parameters of the context. The context generation procedure results in defining a data transfer path between the GGSN 58 and the PCU 38 servicing the MS 20, and the allocation of an airlink channel for transmission of data from the data transfer path over the air to the MS.

In some embodiments of the invention, SGSNs 52, GGSNs 58 and PCUs 38 are standard units, which do not support IP multicasting, and IP multicasting is implemented by adding additional units as described below. By leaving SGSNs 52, GGSNs 58 and PCUs 38 unchanged, the cost of implementing multicast services in network 10 is substantially reduced. Absent the additional units that support IP multicast, when a plurality of MSs 20 in the same cell 22 request contexts for receiving multicast data of the same multicast service, GGSN 58 duplicates multicast packets it receives for each of the MSs 20 and forwards a separate copy of the multicast packet to each of MSs 20, as is known in the art.

In order to limit the amount of repetitious data transmitted, in some embodiments of the invention, network 10 includes a multicasting gateway GPRS support node (MGSN) 56, which serves as an additional gateway between network 10 and an IP network, e.g., Internet 60, for multicast packets. In some embodiments of the invention, MGSN 56 also masquerades as an SGSN for MSs 20 subscribed to multicast services, as described hereinbelow.

In addition, network 10 optionally includes a multicast packet control unit (MPCU) 36 between each BSC 34 and its respective PCU 38. MPCU 36 monitors the signals passing between MSs 20 and SGSN 52, alters the signals and/or generates additional signals in order to provide multicasting support, as is now described.

In some embodiments of the invention, MPCU 36 operates to assign, for each cell 22 in which one or more subscriber MSs 20 of a multicast service are located, a virtual MS subscriber (referred to herein as VMS 37) which represents the subscribers in the cell 22 before SGSN 52. MPCU 36 instructs all the subscriber MSs 20 in the cell to listen to a channel assigned to the virtual subscriber 37.

The multicast data transmitted, may include, for example, video and/or audio streaming, text streaming and/or any other data which may be of interest to many users. It is noted that not all the data transmitted to the subscriber of MS 20 must be provided to the user. For example, the application running on the MS 20 may screen out data which does not interest the user.

Figure 3:
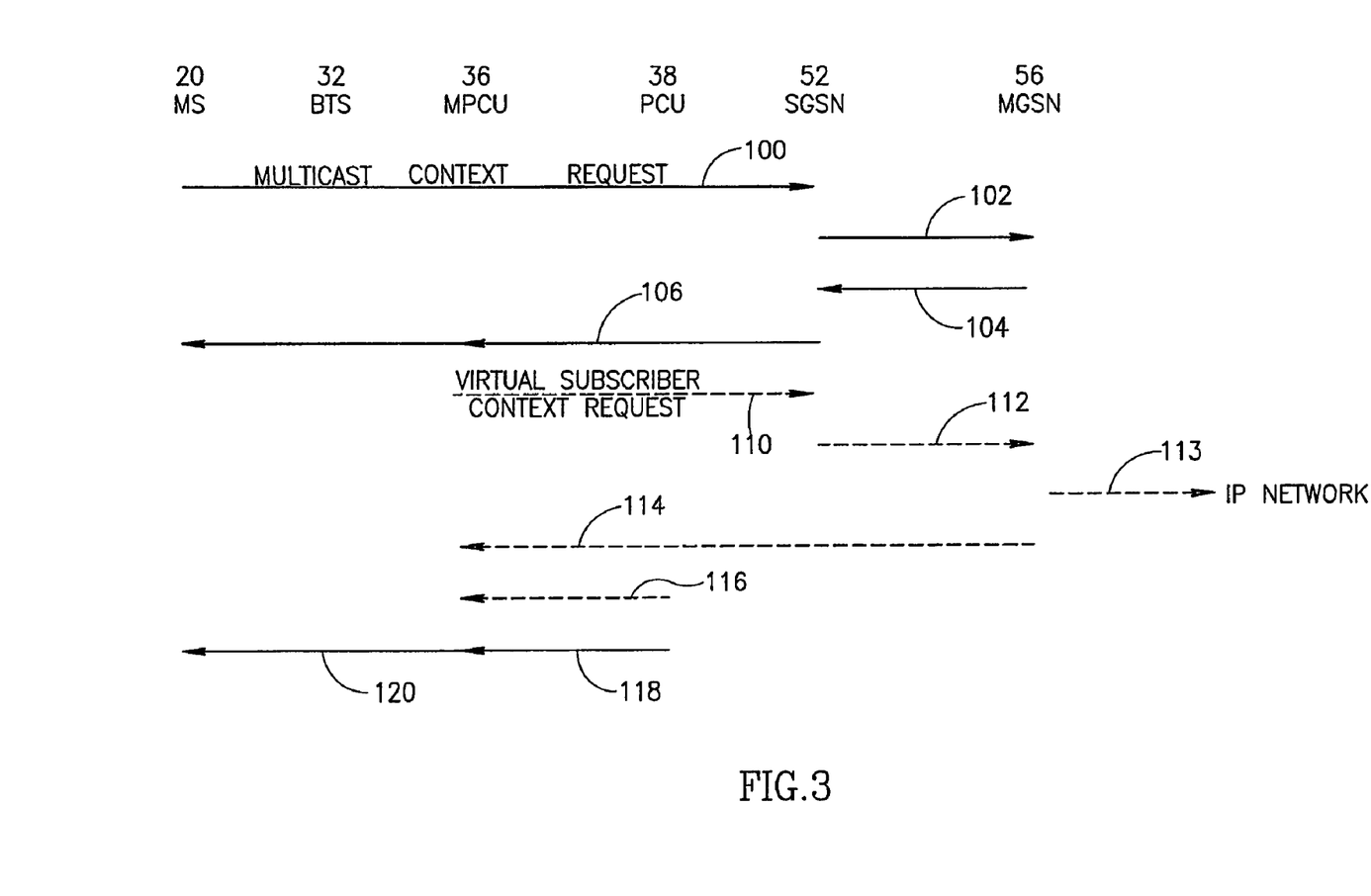
FIG. 3 is a signal chart of the signals exchanged in a cellular network when an MS requests to join an IP multicast service, in accordance with an embodiment of the present invention.

FIG. 3 is a signal chart of the signals exchanged in network 10 when an MS 20 requests to join an IP multicast service, in accordance with an embodiment of the present invention. In order to join a multicast service, the MS 20 optionally transmits a context activation request 100 with a requester IP multicast address, to SGSN 52. In some embodiments of the invention, the request to join a multicast service is transmitted responsive to a user command. Alternatively or additionally, the request to join a multicast service is transmitted responsive to an automatic command generated in accordance with a preconfigured schedule. As is known in the art, SGSN 52 forwards the request 102 to the appropriate GGSN, addressed in the context request.

In some embodiments of the invention, MS 20 states MGSN 56 in the APN field (which identifies the GGSN of the context) of the multicast context requests it transmits. The statement of an MGSN 56 in the APN field optionally serves as an indication that the context request is to be handled in accordance with the cellular multicast procedures of an embodiment of the present invention. Alternatively, MPCU 36 identifies multicast context requests (e.g., according to their requester IP address) and alters their APN field, such that they are directed to MGSN 56 instead of GGSN 58. In this alternative, MPCU 36 listens to all the context requests transmitted by MSs 20 to determine which context requests require cellular multicast handling. It is noted that such listening is not required for other embodiments of the invention. Further alternatively or additionally, MGSN 56 is located on the path between SGSN 52 and GGSN 58. MGSN 56 intercepts multicast context requests, identified for example by their IP address, directed to GGSN 58 and handles the requests on its own. Optionally, further packets belonging to the context request procedure are marked by MGSN 56, e.g., MGSN 56 is stated in the APN field. In these alternatives, the subscriber MS 20 may not be aware that it is receiving special cellular multicast handling.

Alternatively or additionally to identifying cellular multicast context request packets by their APN field, subscriber MSs 20 label the context requests to receive cellular multicast handling with a proprietary field. Further alternatively or additionally, cellular multicast context request packets are identified by the IP address to which they relate.

Optionally, cellular multicast handling according to embodiments of the present invention is applied to all context requests having an IP multicast address (i.e., IP addresses in the range 224-255). Alternatively, cellular multicast handling is applied to context requests having 1P addresses belonging to a predetermined group of IP addresses. The IP addresses receiving cellular multicast handling may include a subset of IP multicast addresses and/or a group of IP unicast addresses.

Responsive to receiving context request 102, MGSN 56 optionally determines whether the MS 20 is allowed to join the multicast service and accordingly transmits a context response 104 to the MS 20, with a positive or negative answer. In some embodiments of the invention, MGSN 56 determines whether MS 20 may join the multicast service responsive to the service agreement of the subscriber and/or the identity of the multicast service. Alternatively or additionally, MGSN 56 determines whether MS 20 may join the multicast service responsive to the location, e.g., the cell, in which the subscriber is currently located, the time, date and/or any other external parameter. Optionally, MGSN 56 manages a database which lists for each user the multicast services to which the user may join. Alternatively or additionally, the database is managed at a central location in cellular network 10 and MGSN 56 consults the database in determining whether to allow a user to subscribe to a multicast service.

In some embodiments of the invention, MGSN 56 keeps track of the time during which the MS 20 is a subscriber to the multicast service, for billing purposes. Alternatively or additionally, MGSN 56 keeps track of one or more other parameters of the multicast subscription, such as the location of the subscriber MS.

In some embodiments of the invention, MGSN 56 does not establish a connection in the IP network for the MS subscriber 20, as the connection will be established for the virtual subscriber 37. Optionally, MGSN 56 examines the context requests it receives to determine whether they are from a virtual subscriber 37 or from a real MS 20. The determination is optionally performed by comparing the identity of the subscriber to a list of predetermined virtual subscriber 37 identities. Alternatively or additionally, virtual subscriber 37 identities have one or more unique bit sequences in their subscriber identities and they are identified accordingly.

A negative answer is optionally handled by SGSN 52, PCU 38 and MS 20, using standard methods known in the art. Optionally, the negative answer is followed by a message With an explanation of the reason the request is denied, a list of multicast services to which the user is allowed to join and/or a request to contact the service provider.

If MGSN 56 responds with a positive response, e.g., a PDP context accept message, SGSN 52 forwards a context accept message 106 to the MS 20. MPCU 36 optionally listens to the context accept messages passing through it and determines for each message whether the message relates to a multicast address. Optionally, MPCU 36 determines that a context accept message relates to a multicast service according to its being generated by MGSN 56. Alternatively or additionally, MPCU 36 determines that a context accept message relates to a multicast service according to the IP address used.

For multicast address contexts, MPCU 36 optionally determines whether a virtual subscriber 37 for the multicast service, in the cell 22 in which the MS 20 is currently located, is currently active. If a virtual subscriber 37 for the multicast service is not active for the cell 22, MPCU 36 emulates a virtual subscriber 37 for the service, in the cell, and transmits a context establishment request 110 for the virtual subscriber 37, to SGSN 52. Optionally, the context request 110 of virtual subscriber 37 includes the multicast address of the requested multicast service, a predetermined virtual subscriber identity and a predetermined QoS (quality of service) of the multicast service. In some embodiments of the invention, MPCU 36 is configured with the QoS to be assigned to each multicast service. Alternatively, MPCU 36 assigns an arbitrary QoS to the multicast services and MGSN 56 inserts a correct QoS value to be used, according to values configured into MGSN 56.

SGSN 52 optionally handles the virtual context request 110 as any other context request, without realizing that it belongs to a virtual subscriber 37, forwarding the context request 112 to MGSN 56.

In some embodiments of the invention, MGSN 56 identifies that context request 112 is a multicast subscription message which was generated by a virtual subscriber 37 and transmits a multicast join request 113 on the IP network. MGSN 56 optionally also responds to the context request with a context accept message 114, as is known in the art. In some embodiments of the invention, MPCU 36 identifies that context accept message 114 relates to a virtual subscriber 37 and therefore does not forward the message to the cell to which it relates. Thus, for each cell 22 and multicast service, only a single context request is serviced by MGSN 56.

As is known in the art, along with context accept message 114 transmitted by SGSN 52 to the virtual subscriber 37, SGSN 52 also transmits a message to PCU 38 instructing the PCU 38 to assign a channel for transmission of data from BSC 34 to the virtual subscriber 37 (i.e., to the subscribers of the multicast service). Responsive to the instruction, PCU 38 may immediately allocate a channel to the virtual subscriber 37 or may allocate the channel when a first packet of data for virtual subscriber 37 is received from MGSN 56. The allocation of the channel generally includes stating a frequency, a channel identifier (e.g., a TFI_DL) and time slots.

In some embodiments of the invention, the channel allocation includes assignment of a continuous stream of time slots, or portions of time slots, at an average rate required for the transmission of the multicast data, such that only a single channel assignment message is required for the entire multicast session of a subscriber MS 20. Alternatively, the channel allocation includes a predetermined number of slots, or one or more portions of slots, and when these slots are exhausted, additional slots are allocated. Optionally, at the time of reassignment, an assignment message is transmitted to each subscriber MS 20 separately, using methods known in the art. Alternatively, an assignment message is transmitted to some or all of the subscriber MSs 20 together. Further alternatively, an assignment message is transmitted to the subscriber MSs 20 embedded within the multicast stream. It is noted that these two alternatives may require changes in the operation of MS 20 relative to operation methods known in the art.

PCU 38 then generally transmits a downlink channel assignment message (e.g. a packet downlink assignment message) 116 to virtual subscriber 37. In some embodiments of the invention, MPCU 36 intercepts the channel assignment message, identified according to the virtual subscriber identity, and uses the assigned channel in changing the downlink channel assignment messages transmitted to MSs 20 requesting multicast services, as is now described.

As is known in the art, along with the context accept message 106 transmitted by SGSN 52 to the MS subscriber 20, SGSN 52 also transmits a message (not shown) to PCU 38 instructing the PCU to allocate a channel for transmission of data from BSC 34 to the subscriber MS 20. In some cases, PCU 38 immediately, responsive to the instruction, allocates a channel to the subscriber MS 20 and transmits a channel assignment message 118 (e.g. a packet downlink assignment message) to the subscriber MS 20 notifying it on the assigned channel. In some embodiments of the invention, MPCU 36 intercepts channel assignment message 118, replaces the downlink channel of the MS 20 with the channel assigned to the virtual subscriber 37 and forwards the corrected channel assignment message 120 to the MS 20. It is noted that although PCU 38 assigns a channel, which is not used, to the subscriber MS 20, there is no waste of air-link bandwidth (i.e., bandwidth between BTS 32 and MS 20). This is because air-link bandwidth is allocated only when the actual transmission is carried out, generally according to the amount of data to be transmitted.

In other cases, PCU 38 waits with the allocation of a channel to MS subscriber 20 until a first data packet for the subscriber is received. As data is not transmitted to the subscriber on the channel allocated to the MS 20, PCU 38 will not allocate a channel to the subscriber and will not transmit an allocation message to the subscriber. In some embodiments of the invention, in these cases, MPCU 36 transmits to MS subscriber 20 a channel assignment message, which instructs the MS subscriber 20 to listen to the channel of the multicast service. Optionally, MPCU 36 generates the instruction message responsive to context accept message 106. Alternatively or additionally, MGSN 56 generates an empty message (e.g., a message with a zero length data field) which is transmitted to the subscriber MS 20 on the allocated link. Responsive to the empty message PCU 38 allocates an air link channel to the subscriber MS 20 and transmits a channel assignment message to the MS 20. MPCU 36 intercepts the channel assignment message and/or the empty message and transmits instead an assignment message of the channel of virtual subscriber 37, as described above.

In some embodiments of the invention, after PCU 38 assigns the virtual subscriber channel, MGSN 56 (or MPCU 36) transmits an empty message (e.g., a message with a zero length data field) to the virtual subscriber 37, so that PCU 38 will assign actual slots to the channel of virtual subscriber 37. Alternatively, the empty message is not transmitted, and the actual slots are assigned when the actual data is received.

In some embodiments of the invention, the context request 100 for the subscriber MS 20 asks for a best effort transmission scheme and/or MPCU 36 or MGSN 56 changes the packet to a request for best effort scheme, so that when no data is transmitted on the assigned channel, bandwidth is not used. Alternatively or additionally, any other QoS which assures minimal or no waste of bandwidth is used. Further alternatively or additionally, the multicast channel is assigned a constant bandwidth QoS, such that other (e.g., less important) unicast data does not interfere with the multicast data. In some embodiments of the invention, the QoS rating of the multicast channel is changed according to the number of MSs listening to the multicast channel and/or according to the QoS deserved by the current subscribers. Further alternatively or additionally to stating the QoS in the context request, a predetermined QoS for context requests of virtual subscriber 37 is configured in the home location registry (HLR) of network 10.

In some embodiments of the invention, responsive to the context request, MGSN 56 determines whether it is already receiving data for the desired multicast service. If MGSN 56 is not receiving data of the desired multicast service, MGSN 56 optionally transmits a multicast subscribe message, for example an IGMPv2 join message, in the packet based network (e.g., Internet 60). If the data is to be received from a unicast address, MGSN 56 optionally establishes a suitable connection for receiving the data, as is known in the art. Optionally, MGSN 56 establishes a connection in which the external entity providing the data is connected to MGSN 56, and MGSN 56 forwards the data to virtual subscribers 37. Alternatively, MGSN 56 generates connections between virtual subscribers 37 and the external entity providing data, and MGSN 56 serves only as a router.

Thereafter, the MS 20 receives data belonging to the multicast service on the allocated channel, using standard methods known in the art. MGSN 56 copies packets directed to a multicast address for each cell from which a vita subscriber message for the specific multicast service was received.

In some embodiments of the invention, a short period after the context request of the subscriber MS 20 is established, MGSN 56 takes over the role of SGSN for the subscriber MS 20. That is, paging messages received for the subscriber MS 20 will be forwarded to MGSN 56, rather than to SGSN 52. Optionally, MGSN 56 takes over of the SGSN role by initiating an inter-SGSN hand-over procedure, as is known in the art, with SGSN 52. Optionally, the take over is performed a predetermined time (e.g., 0.3-0.5 seconds) after context response 104 is transmitted.

In some embodiments of the invention, as described above, MGSN 56 and/or MPCU 36 determine whether to handle a certain packet with cellular multicast handling, according to its IP address. Optionally, in these embodiments, MGSN 56 and/or MPCU 36 manage a list of the IP addresses to receive cellular multicast handling. In some embodiments of the invention, MPCUs 36 are automatically configured by messages transmitted from MGSN 56, while MGSN 56 is configured by a system manager. Optionally, periodically and/or every time the list changes, MGSN 56 transmits an update message to all the MPCUs 36 it services. Thus, the number of entities which require user configuration is relatively small.

In some embodiments of the invention, MGSN 56 and MPCUs 36 communicate over a dedicated link separate from cellular networks 54 and/or 50. Alternatively or additionally, each MPCU 36 establishes a virtual MS channel for communicating with MGSN 56. Optionally, each MPCU 36 establishes a single virtual MS for communicating with MGSN 56. Alternatively or additionally, one or more MPCUs 36 establish a plurality of virtual MSs with an MGSN 56 for communicating control data with MGSN 56. For example, an MPCU 36 may establish a control virtual MS for each cell for which control data needs to be exchanged with MGSN 56. Further alternatively or additionally, control data transmitted between MPCU 36 and MGSN 56 is embedded within the channel used by the virtual subscriber 37.

In some embodiments of the invention, MGSN 56 receives also context requests which are not to receive cellular multicast handling, for example in the above described embodiment in which all the messages to GGSN 58 pass through MGSN 56. In addition, MGSN 56 may be updated more frequently than MSs 20 on the IP multicast services to receive cellular multicast handling. Optionally, in these embodiments, multicast context requests which are not to receive cellular multicast handling are forwarded by MGSN 56 to GGSN 58. Alternatively or additionally, MGSN 56 handles some or all of the context requests not to receive cellular handling, using standard GGSN procedures. Optionally, MGSN 56 determines whether to forward context requests to GGSN 58 or to handle the packets in MGSN 56 based on the load on GGSN 58 and/or on MGSN 56.

In some embodiments of the invention, MSs 20 transmit all context requests which may relate to IP multicast services to MGSN 56 and MGSN 56 determines which context requests receive cellular multicast handling. Thus, MSs 20 do not need to be updated on the IP addresses which receive cellular multicast handling. Optionally, as described above, MGSN 56 forwards to an associated GGSN 58 context requests it does not handle. Alternatively or additionally, MGSN 56 rejects context requests it does not handle. MSs 20 optionally resend the context request to a GGSN 58 responsive to the rejection from MGSN 56.

In some embodiments of the invention, when a paging message is received by MSC 40 for a subscriber MS 20, the paging message is forwarded, as is known in the art, to the SGSN servicing the MS 20, which after the take-over described above is MGSN 56. MGSN 56 optionally encapsulates the paging message in a multicast packet and transmits the encapsulated paging message on the multicast cannel to which the MS 20 is listening. In some embodiments of the invention, the paging message is encapsulated with an address (e.g., an IMSI) of the paged MS 20. Each subscriber listening to the multicast channel will check the address and only the addressed MS 20 should read the contents of the paging message. Optionally, the paging message is encrypted by MGSN 56 and/or by MPCU 36 to prevent other MSs 20 from determining the contents of the paging message. In some embodiments of the invention, an application software running on the MS 20 receives the paging message and displays the paging message to the user or otherwise brings the message to the attention of the user. Optionally, the user may choose to respond to the paging message (leaving the multicast service) or may ignore the paging message.

Alternatively to forwarding the paging message to MGSN 56, the paging message is forwarded to PCU 38, which sends a standard paging message to the subscriber MS 20. MPCU 36 intercepts the paging message and encapsulates the paging message onto the multicast data transmitted on the multicast channel. In some embodiments of the invention, according to this alternative, instead of MGSN 56 masquerading as an SGSN for subscriber MSs 20, SGSN 52 remains as the SGSN handling the subscriber MSs 20. When a paging message is received for a subscriber MS 20, the message is forwarded to PCU 38 by SGSN 52. Alternatively to MPCU 36 intercepting the standard paging message, a paging interception unit (not shown), is positioned between SGSN 52 and PCU 38. The paging interception unit intercepts paging messages, for multicast subscriber MSs, directed to PCU 38 and encapsulates the paging messages into the multicast stream and/or instructs MGSN 56 or MPCU 36 to encapsulate the paging message into the multicast stream.

In some embodiments of the invention, an MS 20 may subscribe to a multicast service, while having another active context, e.g., a unicast context. Optionally, when a user establishes a multicast context in addition to the unicast context, MGSN 56 notifies the GGSN 58 servicing the unicast context that it is now the SGSN of the MS 20, such that the data from the GGSN 58 is routed to the MS 20 through MGSN 56. Data directed to the MS 20 on the unicast context, is encapsulated by MGSN 56 into the multicast stream and transmitted on the multicast channel of the virtual subscriber 37. In some embodiments of the invention, the unicast data is encrypted. Optionally, MGSN 56 keeps track of the amount of unicast data each MS 20 received on the virtual subscriber channel, for billing purposes. Alternatively or additionally, GGSN 58 keeps track of the amount of data transmitted and/or the billing is not related to the amount of data. Optionally, the data for the MS 20 on the unicast context includes pre-assigned uplink slots, which the MS can use for uplink transmission, e.g., acknowledgment messages. Alternatively or additionally, the MS 20 leaves the multicast channel in order to request uplink slots.

In some embodiments of the invention, the unicast data is given low priority relative to the multicast data. Alternatively or additionally, the priority of the unicast data is determined based on the service agreement of the user.

Alternatively to MPCU 36 creating a virtual subscriber 37 (exchanging messages 110, 112, 114, 116) responsive to identifying context accept message 106, virtual subscriber 37 is created responsive to identifying channel assignment message 118.

In some embodiments of the invention, MSs 20 requesting to join a multicast service, in a cell 22 overlapped by an umbrella cell 22A, are instructed to communicate through the BTS 32 of the umbrella cell 22A. Thus, only a single channel is required for all the MSs subscribing to the multicast service in the umbrella cell 22A and the amount of airlink bandwidth required for multicast transmission is reduced. In some embodiments of the invention, the instruction to move to the umbrella cell comprises a CELL_CHANGE_ORDER instruction message, as is known in the art. Optionally, the instruction message is generated by MPCU 36 responsive to the context request accept message and/or responsive to the context request message. Alternatively, the instruction message is transmitted to the MS 20 at any other stage of the connection process.

In some embodiments of the invention, when an MS 20 receives a CELL_CHANGE_ORDER message, the MS 20 moves to the new cell 22 (e.g., an umbrella cell 22A) and sends a new context request. Alternatively or additionally, upon moving to the new cell 22 the MS 20 transmits a cell update message, a routing area update message and/or any other location update message, which is tracked by MPCU 36. The MPCU 36 then optionally continues the session with the MS 20 from the point at which the session was terminated in the old cell 22.

In some embodiments of the invention, MPCU 36 is configured with instructions on the cells from which subscribers are to be moved to overlay cells and optionally the identity of the overlay cells. Optionally, the cell transfers depend on the specific multicast services. For example, data of certain multicast services (e.g., popular services) may be provided only in overlay cells 22A, while data of other multicast services is provided in any cell 22 in which the data is requested. Alternatively or additionally, whether to provide data in an overlay cell 22A or in all cells is determined responsive to the time, date and/or the current load of network 10. For example, when there is a relatively low load, multicast data may be transmitted in all cells, while when network 10 is relatively loaded multicast data is provided, when possible, through overlay cells 22A.

In some embodiments of the invention, multicast services according to the present invention are not provided at all in one or more cells 22, and all multicast services are provided by umbrella cells 22A overlapping these one or more cells.

In some embodiments of the invention, one or more multicast services in one or more cells 22 (for example overlay cells 22A) have static virtual subscribers 37 which continuously receive the multicast data of the service, regardless of whether a subscriber of the service is currently in the cell. Optionally, the multicast data is constantly transmitted on a respective wireless (TFI_DL) channel in the cell which includes the static virtual subscriber. Alternatively, the wireless air link channel is allocated only when there is at least one subscriber in the cell, while otherwise the multicast data reaching the PCU 38 of the cell is discarded.

In some cellular data networks, when an MS 20 requests data, the MS 20 states a value of a parameter (e.g., a network service access point identifier (NSAPI)), which is to identify the packets carrying the data. The MS 20 then discards all packets which do not carry the stated value of the parameter, as is known in the art. In some embodiments of the invention, the multicast data transmitted to subscriber MSs 20 is transmitted with the lowest allowed value of the parameter (e.g., 5), under the assumption that all the subscriber MSs 20 will choose the lowest value of the parameter. This assumption is assumed to be correct since subscriber MSs 20 are generally not allowed to have more than one active context. Alternatively or additionally, control signals which limit the range of values of the parameter that may be used for multicast applications, are transmitted to the MSs 20. The control signals limiting the range of values of the parameter are optionally transmitted to MSs 20 by SGSN 52. Alternatively or additionally, MPCU 36 changes the control signals transmitted to MSs 20 and/or generates the transmitted control signals. In an exemplary embodiment of the invention, the control signals which limit the range of values of the parameter comprise the XID signal known in the art and/or any other control signals according to the link layer control (LLC) protocol.

Optionally, the control signals which limit the range of values of the parameter are transmitted to all the MSs 20 in cells 22 which support multicast or in all the cells regardless of whether they support multicast Alternatively, control signals which limit the range of values of the parameter are transmitted only to MSs 20 which requested multicast service, for example responsive to the context request. In an exemplary embodiment of the invention, MPCU 36 determines the NSAPI value stated in context requests for multicast services. If the context request states an NSAPI value on which multicast signals are transmitted, the MPCU 36 allows transmission of the multicast channel allocation to the MS 20. If, however, the MS 20 used an NSAPI value different than used by the virtual subscriber 37, MPCU 36 discards the context request or otherwise prevents the transmission of the channel allocation of the multicast data to the MS 20. Instead, MPCU 36 optionally transmits to the MS 20, an XT message which limits the range of NSAPI values which can be used. The MS 20 will then retransmit the context request with the NSAPI value suitable for multicast data.

In some embodiments of the invention, control signals which limit the range of values of the parameter comprise a message which identifies only a single value as suitable for the transmitted multicast signals. Optionally, the control signals which limit the range of values of the parameter comprise a message that identifies only a single value as suitable for use with uncompressed data and the MSs 20 are programmed to use an uncompressed value for multicast data.

In some embodiments of the invention, MPCU 36 keeps track of the number of subscriber MSs listening to each multicast service in order to determine when a multicast service does not have subscribers and the virtual subscriber 37 should be deactivated. Optionally, MPCU 36 intercepts power measurement messages transmitted by subscriber MSs 20, and accordingly determines which subscriber MSs 20 are still active in the cell Alternatively or additionally, when MGSN 56 receives a notification that an MS 20 moved to a different SGSN 52, MGSN 56 notifies the MPCU 36 that the MS 20 left its cell. Further alternatively or additionally, when MGSN 56 receives a context request for a new multicast service and/or from a new cell, MGSN 56 notifies the old MPCU 36 that the subscriber MS 20 moved cells. It is noted that the movement may be between two cells serviced by the same PCU 38. In such cases MPCU 36 may determine the movement between cells on its own by intercepting the context requests sent by MSs 20. Optionally, MGSN 56 periodically transmits location update messages which notify the new locations of MSs 20 which moved. In some embodiments of the invention, when a subscriber MS 20 finishes using the multicast service it transmits a context deactivation message, as is now described with reference to FIG. 4. Optionally, the application software on MS 20 displaying the multicast information transmits a context deactivation message whenever the user attempts to establish a telephone call or perform any other action which involves terminating the listening to the multicast data.

Figure 4:
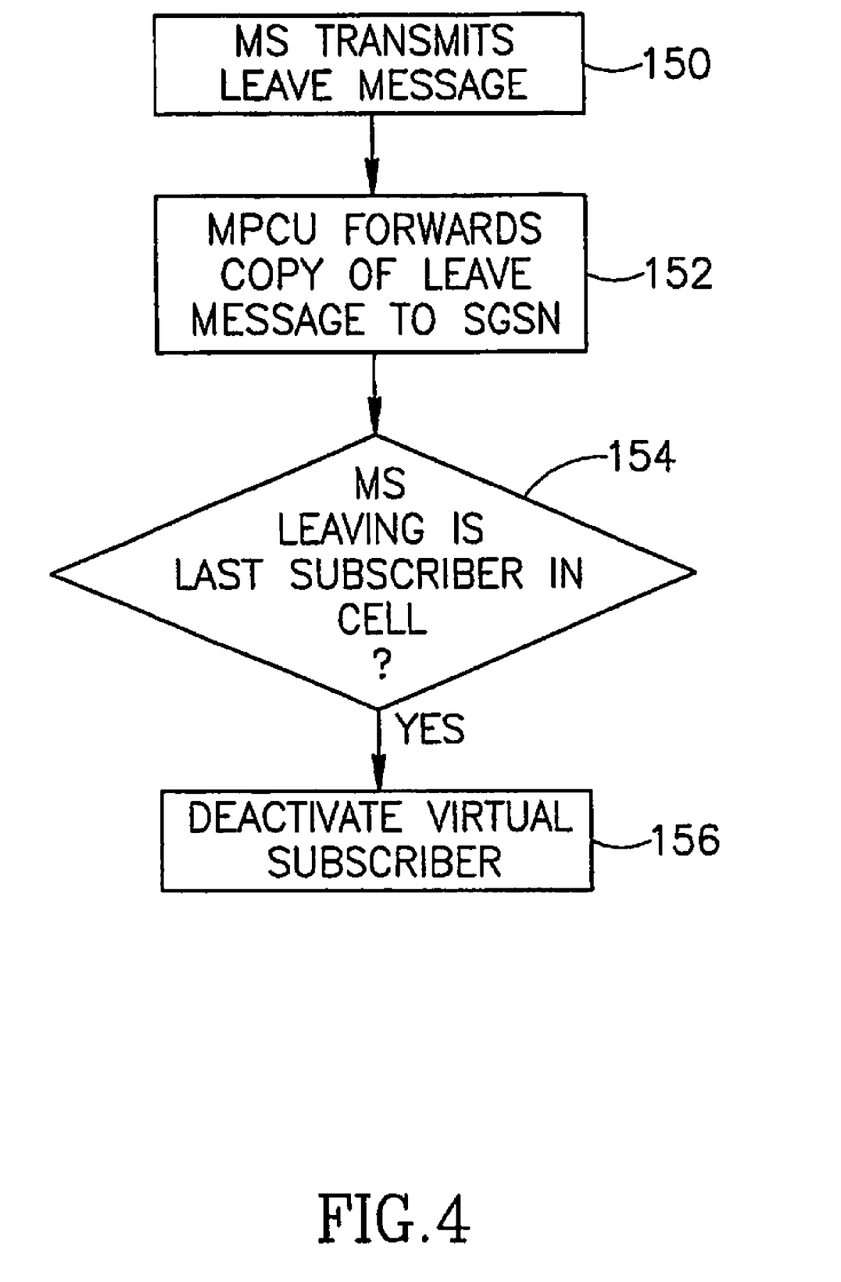
FIG. 4 is a flowchart of acts performed responsive to an MS 20 requesting to leave a multicast service, in accordance with an embodiment of the present invention.

FIG. 4 is a flowchart of acts performed responsive to an MS 20 requesting to leave a multicast service, in accordance with an embodiment of the present invention. When an MS 20 transmits (150) a multicast leave message (e.g., a context deactivate message or a context request for a different address), MPCU 36 intercepts the message while forwarding (152) a copy to SGSN 52, which in turn forwards the request to its destination, e.g., MGSN 56 for context deactivation or GGSN 58 for new unicast context requests. MGSN 56 optionally acknowledges the deactivation and if applicable registers the termination of the multicast use, for example, for billing purposes. If (154) the MS 20 requesting to leave the multicast service is the only subscriber within its cell 22, MPCU 36 optionally initiates the deactivation (156) of the context of the virtual subscriber 37.

Alternatively or additionally, the user of a subscriber MS 20 is required to periodically show a life signal. The life signal may include pressing one or more buttons of MS 20 and/or moving MS 20, such that the movement is recorded by a movement sensor included in MS 20. If a life signal is not received by the multicast application for over a predetermined period (e.g., between 10-30 minutes), the application automatically transmits a context deactivation message for the multicast service.

Further alternatively or additionally, MPCU 36 and/or MGSN 56 periodically cut off the transmission of multicast data, in order to force at least one of the subscriber MSs 20 to request the transmission again. If no request is received, it is assumed that there are no MSs 20 in the cell interested in receiving the multicast data and the transmission of the multicast data is canceled.

In some embodiments of the invention, MPCU 36 periodically polls the MSs 20 subscribed to multicast services, to assure that there is still one subscriber for each active service (i.e., each service for which data is transmitted). Optionally, the rate at which the polling is performed depends on the number of subscribers belonging to the service. When there is only one subscriber, the polling is optionally more frequent than when there are many subscribers. In some embodiments of the invention, for cells in which there are a plurality of subscribers all the subscribers are polled. Alternatively or additionally, the subscribers are polled until one of the subscribers responds. Optionally, when a new subscriber joins the service a schedule for the next polling is deferred. Alternatively or additionally, when a subscriber actively leaves the service, the next polling is performed earlier or immediately when the subscriber leaves the service. In some embodiments of the invention, MPCU 36 transmits the polling messages encapsulated within the multicast stream.

In some embodiments of the invention, when an MS 20 determines that it is not receiving the multicast data of a multicast service to which it is subscribed, the MS 20 optionally transmits a context update request or retransmits the context request. In some embodiments of the invention, the MS 20 checks whether it moved to a different cell 22 before it sends the context update request.

In some embodiments of the invention, instead of establishing a virtual subscriber 37 when a first subscriber MS 20 requests multicast service, a virtual subscriber is established only when a plurality of MSs 20 in a single cell want to receive data of a multicast service, at the same time. Optionally, when MPCU 36 receives a multicast context accept it determines whether an additional MS subscriber joined the same service as referred to in the context accept. If there is no such other MS subscriber, MPCU 36 takes no special action, i.e., allows the context request and channel assignment packets to pass to the MS subscriber unchanged. If, however, there are in the same cell other subscribers belonging to the multicast service, MPCU 36 determines whether a virtual subscriber 37 was established for the service. If a virtual subscriber exists, MPCU 36 performs as described above, i.e., instructs the subscriber for which the context accept was received to listen to the channel assigned to the virtual subscriber 37. If a virtual subscriber 37 was not established, a virtual subscriber 37 is established as described above, and both the MS subscribers 20, i.e., the one for which the context accept was received and the one already belonging to the multicast service, are instructed to listen to the channel of the virtual subscriber 37. Optionally, when an MS 20 leaves the service and only one other MS subscriber remains in the multicast service, the virtual subscriber 37 remains active for the last subscriber. Alternatively or additionally, the last subscriber is moved to a unicast service, as described above.

Alternatively or additionally to joining a multicast address by transmitting a context request for the multicast address, in some embodiments of the invention, joining one or more multicast services is performed by transmitting a predetermined message on a previously established unicast context.

Optionally, the predetermined message comprises a specific IP address of a multicast server in, for example, Internet 60. In some embodiments of the invention, when the predetermined message reaches the multicast server, the server determines whether the user may join the multicast service and responds accordingly to the subscriber MS 20. If the response is positive, MPCU 36 intercepts the response and instructs the subscriber MS 20 to move to the channel of the virtual subscriber 37.

Alternatively or additionally to using a multicast server in Internet 60, MPCU 36 intercepts the predetermined message from the MS 20 requesting to join the multicast service and instructs the subscriber MS 20 to move to the channel of the virtual subscriber 37, responsive to the predetermined message. This alternative is optionally used when joining the multicast service is free and/or when joining authorization is not required. Alternatively or additionally, the joining authorization is performed by MPCU 36, optionally by querying MGSN 56 and/or any other authorization entity in cellular network 10. The predetermined message may be identified by MPCU 36 according to its destination IP address and/or any other predetermined field of the message, for example the message may carry as its source address, the IP address of the multicast service or a fictitious IP address. Alternatively or additionally, the predetermined message may be identified by a specific value in other IP and/or TCP header fields, e.g., reserved fields not used for other purposes, and/or according to specific values in their payload.

As described above, multicast data of a specific service is transmitted from MGSN 56 to PCU 38 for each cell under control of the PCU in which there are one or more subscribers of the service. In some embodiments of the invention, on the other hand, MGSN 56 transmits only a single copy of the multicast data to each PCU 38. Thus, substantial amounts of non-air (e.g., terrestrial or satellite) cellular bandwidth are conserved. Optionally, the single copy of the multicast data is transmitted on the data transfer path (i.e., the channel connecting MGSN 56 and PCU 38 for a specific virtual subscriber 37) of one of the virtual subscribers 37. In some embodiments of the invention, MPCU 36 identifies the data and produces duplicate copies for all the cells 22 under its control which have virtual subscribers 37 for that multicast service. Alternatively or additionally, for example when the tasks of MPCU 36 are performed by PCU 38, the single copy of the multicast data is transmitted on a separate data transfer path, optionally along with a list of the virtual subscribers 37 to receive the data.

Alternatively to adding an MPCU 36 between each BSC 34 and PCU 38, PCU 38 is modified to perform the tasks of MPCU 36. This alternative requires hardware or software changes in PCU 38, but does not require MPCU 36 to keep track of the traffic transmitted to and/or from PCU 38. In addition in this alternative, PCU 38 may transmit paging messages to subscriber MSs 20 either using standard paging procedures on the paging channel of the virtual subscriber channel or encapsulated through the multicast application. Optionally, the user may choose whether to receive paging messages through standard methods or encapsulated in the multicast stream. Furthermore, in this alternative, PCU 38, which includes MPCU 36, knows when a subscriber MS 20 moved between cells 22 under the jurisdiction of the PCU and can immediately update the subscriber MS 20 to move to the virtual subscriber channel of the new cell 22 it entered. Also, PCU 38 can remove the subscriber MS 20 from the list of subscribers in the cell the MS left, and thus keep better track of the number of subscriber MSs of each multicast service in each cell. In addition, when PCU 38 performs the tasks of MPCU 36, it may not be necessary to have MGSN 56 masquerade as an SGSN 52 for MS subscribers 20, as paging messages will be directed through SGSN 52 to PCU 38 which will know to forward the paging messages on the virtual subscriber channel and not on the unused channel of the MS subscriber.

In some embodiments of the invention, the modified PCU sends polling messages to the subscriber MSs 20, using paging messages which include pre-allocated return slots. This allows the MSs 20 to respond to the polls without requesting uplink slots, which may require leaving the multicast context for a substantial period. Alternatively or additionally, the PCU may use standard MS tracking methods to update the list of subscribers in each cell.

Further alternatively or additionally to adding an MPCU 36 between each BSC 34 and its respective PCU 38, a multicast unit, referred to herein as a VMNC (virtual multicast network controller), is positioned between BSC 34 and BTSs 32. Optionally, a separate VMNC is located between BSC 34 and each BTS 32. Alternatively, one or more VMNCs are located on a path between BSC 34 and a plurality of BTSs 32. The VMNC is optionally located near BSC 34 such that it may be serviced together with BSC 34 and/or may be accessed by maintenance personnel in the same manner as BSC 34. The VMNC optionally performs substantially the same tasks as those described above for MPCU 36. For example, the VMNC optionally identifies create PDP context accept messages transmitted to subscriber MSs 20 and accordingly generates virtual subscribers and moves the MSs to the data channels of the virtual subscribers.

Implementing a VMNC may be simpler than implementing an MPCU 36, as the PCU 38 and the BSC 34 generally sit in the same box and the interface between them is generally proprietary. A VMNC, on the other hand, generally receives standard signals transmitted between BSC 34 and a BTS 32 and therefore may more simply be an add-on unit. It is noted, however, that each BSC 34 requires only a single MPCU 36 (as the MPCU sits at the single network entrance to the BSC), while in some embodiments a VMNC is required for each cell which carries multicast data (as a VMNC sits on the BTS entrance of the BSC, and the BSC may have many BTS entrances). If multicast data is supplied in all the cells 22 of a BSC 34, or in many of the cells 22, a large number of VMNCs may be required for each BSC 34. If, on the other hand, as described hereinbelow, multicast services are provided only in a limited number of cells 22 for each BSC 34, the number of VMNCs required is not substantial.

In addition, unlike MPCU 36, the VMNC sits on the path of circuit switched paging signals directed from MSC 40 to subscriber MSs 20. In some embodiments of the invention, the VMNC listens to circuit switched (CS) paging messages transmitted to the MSs 20, through BSC 34. When a paging message is received for a subscriber MS 20, the VMNC intercepts the paging message and passes it to the subscriber MS 20 on the multicast channel of the virtual subscriber, encapsulated in the multicast data.

In some of these embodiments of the invention, the MGSN does not masquerade as an SGSN. It is noted, however, that in some embodiments of the invention, the MGSN masquerades as an SGSN even when VMNCs are used, so that the paging signals may be monitored by the MGSN.

In some embodiments of the invention, instead of providing multicast data through the same cells 22 as used for unicast (single user) data, separate unicast cells 22 (e.g., using different frequencies), are defined for multicast data. Optionally, the separate multicast cells are defined by separate BTSs 32. Alternatively or additionally, one or more BTSs 32 include two or more transmitters which transmit the data for two different cells on the same antenna and/or using the same control apparatus.

In some embodiments of the invention, the multicast cells cover the same area as corresponding unicast cells. Optionally, each unicast umbrella cell has a corresponding multicast cell. Alternatively, one or more multicast cells have extents which do not overlap any unicast cells. Optionally, the extent of the multicast cells are made large relative to unicast cells, as the amount of bandwidth utilized in a multicast cell depends on the number of multicast services transmitted in the cell and not directly on the number of MSs serviced by the cell. Optionally, the extent of the multicast cells is the maximal extent possible according to cellular transmission regulations. Alternatively or additionally, the extent of the multicast cells is defined so as to provide coverage at substantially every geographical point where multicast service is required, with minimal cell overlap.

By using separate cells for multicast data, the QoS of the multicast data is more tightly controlled, as there are fewer users competing on the multicast data. Optionally, the total bandwidth of the multicast channels allowed to operate concurrently is set not to exceed the bandwidth transmission capabilities of cells 22. Alternatively, the total bandwidth of the multicast channels allowed to operate concurrently is set to exceed the bandwidth transmission capabilities of the cells 22 by at most a predetermined margin. In some embodiments of the invention, if a request for regular data and/or for telephone service is received in a multicast cell, MPCU 36 or the VMNC discard the request, optionally transmitting a negative response to the client, so that the QoS of the multicast channels is not impeded. The MS will generally tune on to a different cell 22 to receive the service it requests. Alternatively or additionally, MPCU 36 or the VMNC directs the MS 20 requesting regular data and/or telephone service to a regular cell, for example by transmitting a change cell order message to the MS 20. Further alternatively or additionally, a predetermined number of low bandwidth channels, e.g., telephone channels, which do not interfere with the multicast channel, are allowed to be used in the multicast cell.

In some embodiments of the invention, for example in order to simplify the allocation of air bandwidth, each multicast channel is provided a predetermined amount of bandwidth (e.g., slots) and this allocation is kept constant throughout the operation of the virtual subscriber requesting the multicast channel.

In some embodiments of the invention, when an MS 20 desires to receive multicast service, the MS 20 transmits a multicast context request, as described above, in the cell 22 it is currently in. In response to the context request, the MS 20 is instructed by a network element, such as an MPCU 36 or a VMNC, to move to a multicast cell, as described above regarding moving to umbrella cells 22A.

Alternatively, when an MS 20 desires to receive multicast service, the MS 20 moves to the multicast cell at its own initiative and sends the request for multicast service in the multicast cell. Optionally, the multicast cells advertise themselves as belonging to a virtual public land mobile network (PLMN), which has an identity different from that of the PLMN formed of the terrestrial portions of cellular network 10. The multicast cells optionally appear to network 10, e.g., to BSC 34 and SGSN 52 as regular cells. The VMNCs of the multicast cells, however, optionally change the network identity in the LLC protocol signals transmitted in the multicast cells, such that the MSs 20 use the multicast cells only for multicast services in accordance with the present invention. When an MS 20 wants to conduct a unicast session it locks on to a cell 22 which has the real identity of network 10. When the MS 20 wants to receive multicast data, the MS 20 locks on to a multicast cell and transmits the context request and/or any other data request described above. By having the MSs 20 move to the multicast cell on the user's initiative, there is no need for the VMNCs (or MPCUs) to monitor the signals transmitted in the unicast cells 22. Therefore, in some embodiments of the invention, VMNCs are provided only in the multicast cells and the amount of monitored traffic is substantially reduced.

Figure 5:
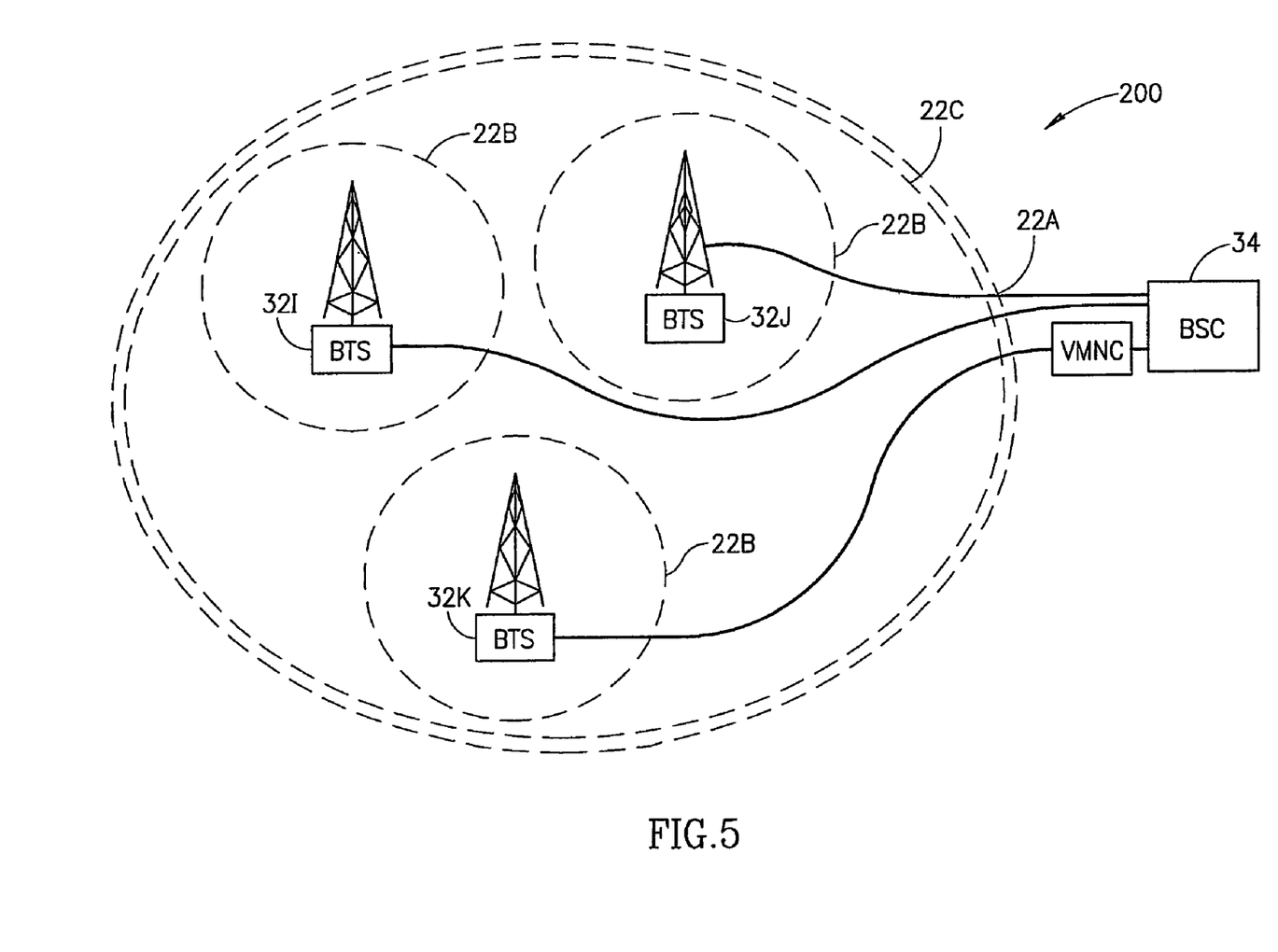
FIG. 5 is a schematic illustration of a multicast supporting cellular network, in accordance with an alternative exemplary embodiment of the present invention.

FIG. 5 is a schematic illustration of a multicast supporting network 200, in accordance with an embodiment of the present invention. Network 200 includes a BSC 34, and a plurality of BTSs 32 (marked 32I, 32J and 32K in FIG. 5) which define cells 22 (marked 22A, 22B and 22C in FIG. 5). As is known in the art, some of the cells are small cells 22B and others are umbrella cells 22A. One or more BTSs 32 define multicast cells 22C. The BTSs 32 defining the multicast cells 22C may be used solely for the multicast cells and/or may service one or more additional cells, small cells 22B and/or umbrella cells 22A. For the following explanation it is assumed that BTS 32K services umbrella cell 22A and multicast cell 22C, in addition to an adjacent small cell 22B.

For each multicast cell 22C, and/or for each BTS 32 servicing at least one multicast cell 22C, network 200 comprises a VMNC 204 which is located on the communication link between BSC 34 and the BTS 32 servicing the multicast cell 22C. Alternatively or additionally, a single VMNC 204 is located on the path between BSC 34 and a plurality of BTSs 32 servicing multicast cells 22C.

In some embodiments of the invention, VMNC 204 listens to traffic relating to all the cells serviced by the BTS 32 with which it is associated. Alternatively, VMNC 204 listens only to traffic relating to multicast cells 22C.

When all the multicast channels cannot be provided in a single cell, two overlapping multicast cells 22C are optionally provided in each region. Optionally, MSs 20 are configured with the identity of the virtual network of the multicast cell 22C that they are to lock on, for each specific multicast channel. Alternatively or additionally, the MS 20 is configured to lock onto a multicast cell 22C with a specific virtual network identity. If the specific multicast channel requested by the MS 20 is provided by a different multicast cell 22C, a cell change instruction is transmitted to the MS 20, for example by VMNC 204.

Alternatively or additionally, one or more multicast channels are provided in the unicast cells, while the remaining multicast channels are provided in the multicast cells. In some embodiments of the invention, an MS desiring to tune onto a multicast channel, consults an internal pre-configured table which states whether the multicast service is provided in regular cells or in multicast cells. Alternatively or additionally, the MS consults an out-of-band data source, such as a Web server, which stores current information on the availability of multicast data. Further alternatively or additionally, periodic updates of the multicast transmission schedule are transmitted to some or all of MSs 20. Further alternatively or additionally, a multicast channel, for example in the multicast cell, is used to transmit the multicast channel schedule to MSs 20 interested in the schedule.

Alternatively, an MS 20 desiring to tune onto a multicast channel, always tunes onto a multicast cell 22C, regardless of which multicast channel is desired. If the multicast channel is provided in a regular cell, the VMNC 204 of the multicast cell 22C instructs the MS 20 to change back to a regular cell in which the desired multicast channel is provided. Optionally, each of the unicast cells which may provide multicast channels has a VMNC 204. In some embodiments of the invention, the establishment of the context is performed in the multicast cell 22C before the MS 20 is instructed to transfer to the regular cell. Optionally, in these embodiments, the VMNCs 204 of unicast cells 22C are adapted to perform fewer tasks than the VMNCs 204 of multicast cells 22C, as they are not required to establish connections. Alternatively, for example for simplicity, all the VMNCs 204 have the same functionality.

Alternatively to MGSN 56 serving as a gateway, instead of GGSN 58, for multicast packets, GGSN 58 performs the gateway tasks. In this alternative, MGSN 56 is optionally located between SGSN 52 and GGSN 58 and listens to all the traffic passing between SGSN 52 and GGSN 58. Optionally, when a context request for a multicast service handled by MGSN 56 is transmitted to GGSN 58, MGSN 56 determines whether the context request is from a virtual subscriber 37 or from a subscriber MS 20. If the context request is from a virtual subscriber 37, MGSN 56 responds to the request as described above. If, however, the context request is from a virtual subscriber 37, MGSN 56 forwards the request to GGSN 58 for handling. GGSN 58 optionally responds to the request, as performed for regular context requests, with a context accept message.

Optionally, MGSN 56 monitors the responses of GGSN 58, for example in order to determine when to take over the role of SGSN for the subscriber MS 20. Alternatively or additionally, the tasks of MPCU 36 are implemented by PCU 38 and the take over is not required.

Although in the above description the multicast data is described as passing on a unicast channel dedicated for transmission of multicast data of a single multicast service, in some embodiments of the invention, the multicast data is transmitted to MSs 20 on a channel serving for more than one multicast service and/or serving for data of one or more broadcast or unicast connections in addition to the multicast data The use of a single channel for a plurality of multicast services and/or for both broadcast and multicast services allows, in some cases, for better utilization of the bandwidth of the channel. In addition, transmitting a plurality of multicast services on a single channel allows for easy reception of a plurality of multicast services concurrently by a single MS 20.

In some embodiments of the invention, the multicast data is provided on a broadcast channel. Optionally, the broadcast channel is a channel to which all MSs 20 in a cell may listen without performing a channel authentication procedure (although a network registration may be required). Alternatively or additionally, the broadcast channel is a channel to which all the MSs 20 in the cell listen, optionally in parallel to a unicast channel. In some embodiments of the invention, a cellular network provides a plurality of broadcast channels, and one or more of these channels is used for multicast data.

Alternatively or additionally, the multicast data of one or more services is provided on a unicast channel. Optionally, unicast channels used for multicast are used only for multicast. Alternatively or additionally, the multicast data of one or more services is provided on a unicast channel used for a unicast purpose in addition to the multicast data. For example, a user may receive a unicast connection at reduced price, agreeing to the use of the unicast channel also for multicast data. Optionally, the unicast user of the channel receives two-way communication, while the multicast MSs 20 only receive data.

In some embodiments of the invention, when an MS 20 is instructed to receive data of a multicast service, the MS 20 transmits a request for the multicast data to a predetermined address. The transmission of the request may be performed using any of the methods described above, including establishing a unicast connection to a predetermined address and transmitting the request on the unicast connection. Thereafter, an authentication process is performed, which process results in providing a multicast reception identifier and/or key to the MS 20. The MS 20 then optionally tunes onto a channel of the cell in which the multicast service is provided. The tuning onto the channel may be based on predetermined data (e.g., all multicast data is provided on a specific channel) or based on the provided identifier.

In some embodiments of the invention, the multicast data is encrypted and the multicast key comprises an encryption decoding key, which is used to decode the encrypted data. Alternatively or additionally, the multicast identifier comprises a source IP address and/or other header data identifying packets of the of the requested multicast service. Further alternatively or additionally, the multicast identifier comprises indication of a specific channel on which the multicast data of the requested service is to be received. The indication of the specific channel may include, for example, a frequency band, a transmission code and/or a time slot scheme. The MS 20 optionally listens to the channel and extracts therefrom the packets that belong to the requested multicast service, according to the multicast identifier and/or key.

The number of multicast services provided on each channel is optionally selected according to the average amount of data provided in each of the multicast services of the channel and the capacity of the channel. In some embodiments of the invention, the multicast services provided together on a single channel are selected in a manner which maximizes the utilization of the channel, optionally by putting services with different peak time patterns on the same channel. For example, a single channel may carry a first multicast service which has high utilization during day hours and a second multicast service which has high utilization during night hours. Alternatively or additionally, the multicast services selected to be provided together on a single channel are services that are expected to be requested together concurrently by same users, for example multicast services relating to similar subjects.

Although the above description relates to a GPRS environment, the principles of the present invention with the necessary adaptations may be used for other environments, such as the Universal Mobile Terrestrial System (UMTS) environment. Data of one or more multicast services may be provided on a dedicated physical channel using a virtual subscriber, as described above. The tasks described above as being performed by MPCU 36 are optionally performed by a network component placed between the Node-B element of UMTS and the radio network controller (RNC) of UMTS. Alternatively or additionally, one or more multicast services are provided on a dedicated MAC channel over the forward access channel (FACH) provided in UMTS cells. Instead of each user receiving an identifier of a different channel, all the users subscribing to the multicast service are provided with a common C-RNTI (Cell Radio Network Temporary Identifier). Further alternatively or additionally, one or more multicast services are provided on a forward access channel (FACH) using the cell broadcast service (CBS).

A subscriber MS 20 in the UMTS environment, referred to also as a user equipment (UE), optionally requests a multicast service by transmitting a request to a multicast supply address. The multicast supplier optionally responds with a channel identifier, for example physical channel information when a dedicated physical channel is used or a C-RNTI when a forward access channel (FACH) is used, and/or a key for receiving the multicast service. The multicast service is provided through the network on the channel of the identifier, optionally using the key.

In some embodiments of the invention, no power control is performed on dedicated physical channels used for multicast, in order to achieve maximal efficiency. Alternatively, power feedback on the dedicated channel is provided by one or more of the subscribers, for example a subscriber with a lowest or highest identification number or by the subscriber to first join the group receiving the multicast service. Optionally, upon joining the multicast service the subscriber is notified whether it is to provide power feedback.

It is noted that the above described elements may be implemented in hardware, software or combinations thereof. Optionally, changes in elements, for example in PCU 38 in order to implement the tasks of MPCU 36, may include changes in hardware, software or combinations thereof. Generally, changes in software only are simpler than when changes in hardware are required.

It is further noted that although the above description relates to multicast data transmission, the provision of specific services in only certain cells is not limited to multicast services. In some embodiments of the invention, web browsing, file transfer, text streaming and/or other data services are provided only in specific cells, carrying the same and/or different network identities. Optionally, services requiring a high quality of service (QoS) are directed to specific cells. In some embodiments of the invention, direction of services requiring high QoS to specific cells is performed regardless of the load in the original cell. In other embodiments of the invention, specific voice services, for example services provided from specific telephone numbers, are provided only in specific cells.

In some embodiments of the invention, one or more specific cells provide only specific services. Other services, such as regular two-way telephone communications and/or unicast data services, are provided only in other cells.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A multicast support unit, comprising:
   an input interface adapted to receive messages exchanged between mobile stations and a cellular packet support node;
   a filter adapted to identify in messages received by the input interface, not directed to the multicast support unit, messages which indicate an intent of a mobile unit to receive multicast data; and
   a controller adapted to instruct a mobile unit, indicated in a message identified by the filter, to receive a specific multicast channel.

2. A unit according to claim 1, wherein the multicast support unit is adapted to be positioned between a base station controller and a base transceiver station.

3. A unit according to claim 1, wherein the input interface serves also as an input interface of a packet control unit.

4. A unit according to claim 1, wherein the multicast support unit is adapted to be positioned between a base station controller and a packet control unit.

5. A unit according to claim 1, wherein the filter is adapted to identify messages which indicate an intent to receive multicast data and include at least one field that identifies a specific multicast service.

6. A unit according to claim 1, wherein the messages that indicate the intent comprise messages having IP headers.

7. A unit according to claim 1, wherein the messages that indicate the intent comprise PDP context messages.

8. A unit according to claim 1, wherein the filter is adapted to identify messages directed to a mobile unit, that indicate the intent to receive multicast data.

9. A unit according to claim 1, wherein the filter is adapted to identify messages transmitted from a mobile unit, that indicate the intent to receive multicast data.

10. A unit according to claim 1, wherein the filter is adapted to identify messages according to a value of at least one header field.

11. A unit according to claim 1, wherein the filter is adapted to identify messages according to a value in the payload of the message.

12. A unit according to claim 1, wherein the controller is adapted to establish the multicast channel responsive to identifying the message that indicates an intent to receive multicast data.

13. A unit according to claim 1, wherein the controller is adapted to instruct the mobile unit to move to a multicast channel that was established before the message was identified.

14. A unit according to claim 1, wherein the controller is adapted to instruct the mobile unit to tune to a different cell responsive to the identified message.

15. A unit according to claim 1, wherein the filter is adapted to identify messages which indicate an intent of a mobile unit to receive multicast data transmitted between the mobile unit and a server external to a land mobile network servicing the mobile unit, through the serving GPRS support node.

16. A unit according to claim 1, wherein the filter is adapted to identify messages which indicate an intent of a mobile unit to receive multicast data transmitted on a previously established unicast context.

17. A method of establishing a terrestrial mobile connection, comprising:
   receiving a message indicating the intent of a mobile unit to receive multicast data, by an intercepting unit to which the message was not directed; and
   generating an instruction to the mobile unit to receive a multicast channel, responsive to receiving the message.

18. A method according to claim 17, comprising determining whether the message indicating the intent relates to a specific group of data connections.

19. A method according to claim 17, wherein the message indicating the intent comprises a context request message.

20. A method according to claim 17, wherein the message indicating the intent comprises a context acknowledge message.

21. A method according to claim 17, wherein generating the instruction is performed by a packet control unit (PCU).

22. A method according to claim 17, wherein generating the instruction is performed by an entity separate from a packet control unit (PCU), which entity does not have control of the PCU.

23. A method according to claim 22, wherein generating the instruction is performed by an entity connected between the PCU and a respective BSC.

24. A method according to claim 22, wherein generating the instruction is performed by an entity located between a BSC related to the PCU and mobile units serviced by the BSC.

* * * * *